United States Patent [19]

Wilson et al.

[11] 4,382,854

[45] May 10, 1983

[54] NI/CO MO P ON TITANIA-ALUMINA HYDRODESULFURIZING CATALYST AND PROCESS OF HYDRODESULFURIZING USING THE SAME

[75] Inventors: Geoffrey Wilson, Westlake Village; Masami Kayamoto, Whittier, both of Calif.

[73] Assignee: Filtral Corporation, Los Angeles, Calif.

[21] Appl. No.: 217,161

[22] Filed: Dec. 16, 1980

Related U.S. Application Data

[60] Division of Ser. No. 46,466, Jun. 7, 1979, which is a continuation-in-part of Ser. No. 874,752, Feb. 3, 1978, which is a continuation-in-part of Ser. No. 874,753, Feb. 3, 1978, Pat. No. 4,196,101, which is a continuation-in-part of Ser. No. 671,333, Mar. 29, 1976, abandoned.

[51] Int. Cl.$^3$ .................. C10G 45/08; B01J 27/14
[52] U.S. Cl. ..................... 208/216 R; 252/437
[58] Field of Search ............................ 208/216 R

[56]  References Cited

U.S. PATENT DOCUMENTS

| | | | |
|---|---|---|---|
| 3,997,431 | 12/1976 | Beuther et al. | 208/216 R |
| 4,003,828 | 1/1977 | Eberly, Jr. | 208/216 R |
| 4,018,714 | 4/1977 | Wilson et al. | 208/216 R |
| 4,083,771 | 4/1978 | O'Hara | 208/216 R |
| 4,186,080 | 1/1980 | Mikovsky et al. | 208/216 R |
| 4,196,101 | 4/1980 | Wilson et al. | 208/216 R |
| 4,251,350 | 2/1981 | Johnson et al. | 208/216 R |

FOREIGN PATENT DOCUMENTS 49-775809  8/1974  Japan .................... 252/465

*Primary Examiner*—Delbert E. Gantz
*Assistant Examiner*—O. Chaudhuri
*Attorney, Agent, or Firm*—Paul E. Calrow; Andrew E. Barlay

[57]  ABSTRACT

This invention relates to improvements in substrates containing alumina and a Group IV-B oxide and in producing the same and in processes of producing hydrodesulfurizing catalysts based on Group VIII and Group VI in the catalysts employing such substrates, and hydrodesulfurizing process employing the same.

3 Claims, No Drawings

NI/CO MO P ON TITANIA-ALUMINA HYDRODESULFURIZING CATALYST AND PROCESS OF HYDRODESULFURIZING USING THE SAME

This application is a divisional application of Ser. No. 46,466, filed June 7, 1979, which in turn is a continuation-in-part of application Ser. No. 874,752, filed Feb. 3, 1978 and Ser. No. 874,753, filed Feb. 3, 1978, now U.S. Pat. No. 4,196,101, which are in turn a continuation-in-part of application Ser. No. 671,333, filed Mar. 29, 1976 and now abandoned.

BACKGROUND OF THE INVENTION

The prior art cited in the above said parent applications are herewith incorporated by this reference. They are Beuther, et al, U.S. Pat. Nos. 3,997,431, 3,940,330, and 3,840,473; Huntley 3,184,415; Fredricksen 3,464,930; Oga, et al 3,544,617; Hinden, et al 3,945,946; Cull, et al 4,039,478 and Japanese Pat. No. 775,809 (translation in file of parent application, Ser. No. 874,753). The aforesaid parent applications are incorporated herein by reference, and are referred to for further details of the disclosures in the aforesaid prior art.

The prior art relating to hydrodesulfurizing catalysts is extensive. The catalysts which have been sold and used in commercial processes for desulfurizing of petroleum distillates and residual oil have been based on a substrate made by calcining alumina hydrates for example, pseudoboehmite. The calcined pellet has been treated with solutions of salt which on calcination are converted into their oxides. These salts are those of metals of the Group VI and Group VIII metals. In the case of a widely used catalyst, the metals are molybdenum usually combined with nickel. The present state of the art includes as useful metals such as cobalt in addition to Mo and also in addition Mo and nickel. Iron has also been suggested as useful metal in combinations with molybdenum.

In such combinations, it has been proposed in the prior art to add a compound metal of the Group IV-B to the pellet, which has been treated with the above salts, as a promotor. The metal, e.g. titanium is employed as the tetrachloride in heptane solution and applied to the substrate to which the molybdenum and nickel has been applied and after calcination of the substrate containing the molybdenum and nickel salts. See Beuther U.S. Pat. No. 3,840,143, cited above.

The product thus produced is stated to place the titanium as a mono-layer on the substrate containing the Mo and Ni. See Frayer, U.S. Pat. Nos. 3,968,027, 3,968,028, 3,068,029. See also, Beuther U.S. Pat. Nos. 3,840,473 and 3,846,285.

As has been disclosed in our U.S. Pat. No. 4,018,714, the problem with incorporating titanium in an alumina substrate, useful in formulating hydrodesulfurizing catalysts, as for example as shown in the above Beuther patents, arises from the use of acidic titanium salt solutions. As disclosed in said U.S. Pat. No. 4,018,714, the non-acidic titanium compound, in the form of an organo titanium salt is added to the alumina pellet. The disclosure of said patent is incorporated herein by this reference. In our U.S. Pat. No. 4,196,101, cited above, this problem is solved by employing a non-acid compound of titanium, specifically titanium hydrate either added as such to the hydrated alumina or to generate the hydrate in situ in the alumina hydrate water mixture. The titania hydrate-alumina hydrate water mixture may then be converted into a shaped form herein referred to as a pellet. The said copending applications are incorporated herein by this reference. Such pellets may be used to produce catalysts, by incorporation of catalyst compounds into the mixture of hydrates prior to shaping, or the shaped pellet may first be dried and calcined prior to impregnation with catalytic compound to form, for example, hydrodesulfurizing catalysts of good abrasion resistance and crush strength.

It has been suggested to form a hydrogenation catalyst for unsaturated and aromatic hydrocarbons from a mixture of alumina hydrate, titania hydrate, iron sulfide and molybdenum desulfide and at least a few percent of water (Johnson, et al, U.S. Pat. No. 2,649,419).

Molybdenum disulfide is reported to sublime at 450° C., which is substantially less than the temperature we have found is desirable to calcine the pellet that is at a temperature and for a period sufficient to convert the hydrates into oxides and to dehydrate the pellet and produce the desired crush strength and abrasion resistance.

Such catalysts may not be subjected to calcination at temperatures in substantial excess of 450° C. to produce substantially anhydrous pellets of sufficient structural strength. We employ the metals, in the form of oxides, together with the titania. The Group VIII metal compound, and Group VI metal compound are employed in the form to produce an oxide on the degree of calcination, desired to produce the physical properties of the pellet. These oxides are stable at temperatures of calcination and at temperatures of use. Thus, we may develop the desired physical properties and retain the catalytic component in the pellet, i.e. the oxides of the Group VIII and Group VI metals.

In the process of the prior art which involved the use of solutions of molybdenum salts or of mixed molybdenum and cobalt or nickel salts, for incorporation into alumina substrates, there is a serious problem of instability of the solutions of the molybdenum salts and complexes used in the impregnation of alumina substrates. The problem associated with the incorporation of these metal salts in concentrations to produce the necessary loading in the substrate, is the difficulty of keeping the molybdenum in solution in sufficiently high concentration, especially in the presence of cobalt or nickel compounds. This difficulty limits the concentration of the salts and the order of application of the compounds.

It is well known that the solubility of the molybdenum or the molybdenum-cobalt or molybdenum-nickel complexes can be made sufficient to hold a relatively high concentration by various expedients. See Molybdenum Chemicals Series, issued by Climax Molybdenum Company, Bulletin Cdb-16, dated January, 1973, and entitled, "Aqueous Solutions of Molybdenum Compounds for Catalysts Application". One of the expedients is the incorporation of the phosphate ion into the solutions. See British Pat. No. 701,217, published Dec. 23, 1953; Pessimisic, U.S. Pat. No. 3,232,887; Colgan, 3,287,280; Jaffee, 3,544,452; Adams, 3,629,146; Mickelson, 3,755,148, 3,755,150, and 3,755,196; Colgan, et al, 3,840,472; Feins, et al, 3,897,365; and Brown, et al. 969,280.

While the above prior art teaches the incorporation of the phosphate ion into the impregnating solution, employing alumina as a substrate in the production of hydrodesulfurization catalysts, it has been stated in the prior art (see Beuther, U.S. Pat. No. 3,840,473) that the presence of a phosphorous or phosphate level approximately 2% by weight in a titanium bearing alumina pellet is completely unacceptable in a titanium promoted Group VIII and Group VI metal bearing hydrodesulfurizing catalyst.

STATEMENT OF THE INVENTION

In our U.S. Pat. No. 4,196,101 we have described our invention relating to hydrodesulfurizing catalysts of superior resistance to abrasion by incorporating the Group IV-B metal compound particularly titanium oxide or in the form of a compound which may be converted into the oxide, for example titanium oxide (titania). For the latter purpose, the preferred procedure according to the invention of this application, includes the incorporation of titanium in the form of titanium oxide and preferably titanium hydrate into alumina, preferably pseudoboehmite, prior to forming the shaped substrate. The formed pellet may then be calcined. The Group IV-B oxide added to the alumina hydrate may be the oxide or hydrated Group IV-B oxide or a compound which may be converted into the Group IV-B hydrate. The mixture is suitably manipulated as by a good agitation of a water suspension of the hydrates, or by mulling or kneading to produce a substantially uniform mixture. The mixture may be combined with a catalytic compound prior to forming and calcination. The calcined pellet containing alumina and Group IV-B oxide may be combined with the hydrodesulfurization catalyst, e.g. the Group VI and Group VIII metals, or any other catalyst employing the pellet as a substrate. The weight ratio of the Group IV-B oxide expressed as anhydrous oxide on a volatile free basis, to the alumina on a volatile free basis, is that which will give the concentration of the oxide suitable for the catalyst.

In forming the pellet, the preferred mixture of alumina and the Group IV-B hydrate if in a water slurry, containing water in excess of that required for pellet formation, may be dewatered, for example, by filtration and drying, if necessary, to the proper consistency for forming into pellets in accordance with the procedures and in the concentration described in said U.S. Pat. No. 4,018,714.

Alternatively, for example, if the pellet be formed by extrusion through a die, the mixture of the alumina hydrate and Group IV-B hydrate may be formed with the required water content for the extrusion mix.

In either case, an intimate mixture of the Group IV-B hydrate and alumina hydrate is formed with a substantially uniform dispersion of the Group IV-B hydrate and the alumina hydrate in the extrusion mix. We may use the Group IV-B metal oxide as the hydrate by mixing the hydrate with the alumina hydrate. The Group IV-B may be introduced by hydrolyzing a compound of the Group IV-B metal, preferably under conditions of sufficiently low acidity and so that when the pellet is calcined, it has the required physical properties. Where the hydrolysis generates excessive acidity, use of a volatile base such as ammonia to neutralize or partially neutralize the acidity may be employed.

Examples of the oxides of the Group IV-B metals which may be used are titania and zirconia preferably introduced into the body of the pellet by admixture of their hydrated form. The Group IV-B hydrate which we presently prefer to use is titania hydrate, $TiO_2 \cdot X H_2O$.

The hydrated alumina which we prefer to employ are the pseudoboehmites such as described in Secor, et al, U.S. Pat. No. 4,010,116, and Lim, et al U.S. Pat. No. 4,086,187. The pseudoboehmite may be peptized as described in said patents.

We prefer to employ a pseudoboehmite which is disclosed in said Secor patent as having a peptizeability index of less than about 0.5% or mixtures of said pseudoboehmite with pseudoboehmites of substantially higher peptizeability and preferably from 25 to 75%, for example 50% of said pseudoboehmite of the lower peptizeability index and from 75% to 25% for example 50% of the mixture of aluminas being the higher peptizeability index, for example, a peptizeability index substantially in excess of about 6%. Such as the aluminas, more particularly identified in said Secor, et al patent incorporated herein.

The shaped and calcined pellet contains substantially anhydrous alumina, i.e. substantially volatile free, and substantially anhydrous Group IV-B oxide, i.e. substantially volatile free, preferably and predominently in the form of anatase, where the oxide is $TiO_2$ in amount being equivalent to about 1% to about 40%, preferably from about 1% to about 25% as Ti, based on the weight of the alumina pellet.

The pellet may be formed by extrusion into pellets as through a die of circular or non-circular shape such as a polyfoil cross-section. It may be formed as pills or spheres or other shapes from a moist mixture of the alumina and titanium compound.

The moisture content of the mixture of alumina and titania for forming into pellets as above, for example, as an extrusion mix for extrusion of cylindrical or non-cylindrical pellets through a die to form pellets of maximum diameter of from about 1/50" to ⅛" of an inch and length of about 1/15" to ¼" ranges from about 50% to about 70% based on all of the components, to wit, the hydrated alumina expressed as $Al_2O_3$ and the content of the hydrated oxide of a Group IV-B metal expressed as anhydrous oxide.

The pellet for use as a catalyst substrate may be formed by drying at a temperature of about 100° F. to around 500° F., and calcination of the above pellets at temperatures in excess of about 900° F., preferably about 1000° F., to about 1500° F. for about ½ hour or more for example about 24 hours.

The time and temperature of calcination is programed to develop the physical properties of crush resistance and abrasion resistance as described below. Unless the catalytic metal compound has been incorporated prior to forming of the pellet, it may then be used as a substrate for incorporation of catalytic metal compounds, as described in the parent patent.

The alumina hydrate, preferably pseudoboehmite is mixed with Group IV-B oxide, either in the form of the anhydrous oxide with sufficient water in the alumina-oxide mixture to permit formation into a pellet, or the hydrated oxide together with sufficient water to form a mixture suitable for forming into a pellet.

For the purpose of this invention, we prefer to form the pellet employing hydrated titanium oxide and add the separately formed titania hydrate to the alumina hydrate.

The nature of hydrated titania ($TiO_2 \times H_2O$) is well known in the art. The water content may range from a relatively dry $TiO_2$ to a water slurry. Typically it may range from about 20% to about 75% by weight of the titania hydrate. This may be added as previously obtained titania hydrate or formed in situ in the alumina slurry as described in the aforesaid parent application, Ser. No. 874,753 now U.S. Pat. No. 4,196,101, incorporated herein.

The hydrate may be formed separately by conventional procedures and mixed with the alumina hydrate. Alternatively, the hydrate may be formed in situ by converting a hydrolyzeable compound in admixture with the alumina into the hydrate preferably maintaining the reaction mixture under conditions that the reaction mixture is insufficiently acid to attack the alumina.

The titanium compound may be an inorganic titanium salt such as titanium tetrachloride ($TiCl_4$) or basic titanium sulfate $TiO(SO_3)$, which is combined with a base preferably under neutral or alkaline pH.

The titanium compound may be an organic titanium compound such as is described in said U.S. Pat. No. 4,018,414, which is incorporated herein by this reference. Such hydrolyzeable compounds may be and preferably are those alkyl or aryl titanates $Ti(OR)_4$ and the chelates referred to in said patent which may be hydrolyzed in the extrusion mix. The hydrolysis may be accelerated by raising the pH of the mixture by addition of the base such as ammonium hydroxide and in the case of the chelates by heating.

Where we use the organo-titanium compounds to generate the titania by hydrolysis in the procedure referred to above, we prefer to use the readily hydrolyzable tetraisopropyl titanate $Ti(OC_3H_7)_4$, tetra butyl $Ti(OC_4H_9)_4$, or tetra hexyl titanate, tetra cis (2-ethyl hexyl) titanate. Tetra hexyl titanate and the chelates may be hydrolyzed under alkaline conditions. In such case, the mixture may be mixed with a base such as ammonium hydroxide to raise the pH to cause hydrolysis of the titanate or the chelate. Where heat is used, the temperature is raised by application of heat preferably below the boiling point of the water in the mix, but sufficient to cause hydrolysis.

The dispersion of the titanium compounds which are not readily soluble in water is aided by using as a carrier medium for the titanium compound, a mutually soluble solvent, for example, primary or secondary alcohols (ROH) where R is $C_1$ to $C_4$, for example, isopropyl alcohol or butanol. The chelates which are soluble in water may be used as a water solution.

Instead of using the organo titanium compound in solution in a solvent mutually soluble with water such as alcohols as above, we may use any of the organic solvents recommended as solvents for the organo-titanium compound, for example, n-heptane, $C_6H_6$, or the chlorinated hydrocarbons or other solvents referred to in said patent. In such case where the titania is formed by mixing with the alumina hydrate and water prior to forming of the pellet, the mixture may be aided by use of known emulsifiers for those solvents and intimate mixing or either. Such emulsifiers are well known to those skilled in that art.

While we prefer to employ the hydrolyzeable salts of titanium, where we form the Group IV-B metal in situ in the pseudoboehmite, we may use the hydrolyzeable salts of zirconium for a like purpose. Such salts may be zirconium tetrachloride ($ZrCl_4$), $Zr(NO_3)_4$, Hausers salt $4.Zro_3.3SO_3.15H_2O$, zirconium acetate which may be converted into the hydrate by neutralization with a base.

The mixture of hydrated alumina, water and Group IV-B compound is dewatered by drying with or without prior filtration to the degree suitable for extrusion and formed into desired shape by conventional techniques.

The pellet, after forming in any of the above procedures, may then be calcined and the Group IV-B compound, if present in the form of the hydrated oxide or present in a decomposable form or in an oxidizeable form as in the case of the organo titanium compound, it is dehydrated or oxidized to form a substantially anhydrous Group IV-B oxide. Should the hydrolyzed organo-metallic titanium contain $(OR)_3$ radicals for example, the titanoxy or titanium-hydroalkoxy compounds as $Ti(OR)_3OH$, or $(RO)_3TiOTi(OR)_3$, be used the calcination oxidizes these products and $TiO_2$ is formed in the calcined alumina titania complex as anatase.

The chemistry of the hydrolysis and conversion of the hydrolyzeable Group IV-B compound is well known. The chemistry of hydrolysis of organo-titanium compound into hydrated titania, $TiO_2.H_2O$ or intermediate hydrolyzed compounds containing alkyl radicals (OR) is described in the brochure "Tyzor Organic Titanates" referred to in said patent and in the literature referred to in said brochure. These are incorporated herein by this reference.

Where the organo-titanium compound is introduced in a non-miscible solution such as where dispersed in the hydrocarbon or chlorinated hydrocarbon solvent and hydrolysis does not occur or occurs only in a limited degree, drying of the pellet and the oxidation or calcination will distill the solvent and convert the organo-titanium compound to $TiO_2$.

The mixture of hydrated aluminum, water and hydrate of the Group IV-B metal, e.g. titania hydrate, is dewatered by drying with or without prior filtration to the degree suitable for extrusion and formed into desired shape by conventional techniques as described above.

The pellet, after forming in any of the above procedures, may then be dried and calcined.

The pellet containing the above intimate mixture of alumina and Group IVB metal oxide whether in the form of hydrate or as anhydrous oxides is a superior carrier for the hydrogenation catalytic compounds of the Group VI or Group VIII metal compound. Since we desire to form the catalyst in the form of a pellet which incorporates the Group VI and Group VIII metals in a form which has the crush resistance and abrasion resistance desired in modern hydrodesulfurizing and other hydrogenation process, we find that calcinations in air at temperatures of the order of 1000° F. and higher and for periods of ½ to 24 hours are desirable, to form the pellet to contain the Group VI and Group VIII in the form of their oxides which are stable and not volatile at the calcination conditions. This we accomplish in our preferred embodiment by introducing the Group VI and Group VIII in the form of their soluble salts, either into the extrusion mix or by applying the solution to the calcined substrate. The composition in the form of a pellet is dried and subjected to the above temperature and times in an oxidizing atmosphere to convert the salts into the corresponding oxides. The pellet thus is generated to form an active catalytic surface. In the case of the Group VI metals, we prefer to employ a water soluble salt of the corresponding anion to wit a molybdate or tungsten preferably employing a volatile cation such as $NH_4$ in the form of a molybdate or a tungstate. The Group VIII metals are employed preferably as the water soluble salts of the corresponding cations, anions such as of the mineral acid, e.g. Cl, $SO_4$, or $NO_3$, or the organic acid anions such as the acetate all of which yield salts with the corresponding cations which may be decomposed by heat to yield the corresponding oxide of the group VI metal, i.e. Fe, Co, or Ni, or mixtures of any two or more thereof.

Of these cations, we prefer to employ molybdenum as the Group VI metal and Ni or Co or mixture of Ni and Co as the Group VIII metal, together with the molybdenum.

The ammonium molybdate or tungsten and the Fe, Ni, or Co salt may be applied as mixtures or in sequence each to the calcined substrate, composed of the intimate mixture of alumina and Group IV-B oxide, as a solution to be absorbed by the calcined substrate. The pellet may then be dried and calcined to produce a pellet containing in addition to the alumina and Group IV-B oxide, the oxides of the Group VIII and Group VI metals.

Instead of applying the salt solutions to a calcined pellet we may introduce the above salts as a mixture of Group VI and Group VIII metals into the slurry or extrusion mix of the mixture of alumina hydrate and the hydrated Group IV-B oxide.

The above catalytic metallic compounds, for use in the hydrodesulfurization processes of our invention, for example, the Group VI metal, if they are to be incorporated into the mixture of the alumina hydrate, and Group IV-B hydrate, prior to forming the pellet, the concentrations and amount of the ingredients should be that required when added to the water in the mixture of alumina hydrate and Group IV-B metal hydrate for forming into the pellet. Thus in the case of the extrusion mix, if the quantities used require water in the mixture in excess of that for an extrusion mix, it may be dried to the required moisture content.

The calcined pellet to which the catalytic metal salts may have been added either prior to formation into a pellet or after calcination of the pellet, has a superior abrasion resistance and crush strength by test procedures described below of about 4 and higher.

To test the resistance to abrasion of the calcined pellets, it is subjected to a test, hereinafter referred to as the "Abrasion Test", as follows:
100 grams of dry catalyst pellets which have been calcined at 800° F. are placed in a standard test cylinder (10⅜" OD and 6⅜" deep) and rotated 33⅞ minutes at 54 rpm. The material is then screened through a 32 mesh screen and the fines passing through the screens are weighed. The abrasion loss as fines is reported as the weight percent of the original sample. This percentage is herein referred to as the "Abrasion Index."

The pellets and catalyst of our invention employing such pellets is characterized in that it will have an "Abrasion Index" of less than about 10% and preferably less than about 2% to 3%.

Typical examples of suitable concentrations of metal compound for hydrosulfurizing uses, expressed as the metal element in the calcined substrate of our invention, prior to loss by abrasion, as is illustrated by the following examples, is, for example, about 1% to 25% of Group VI metal, e.g. Mo, or W, and about 1% to about 25% of Group IV-B metal, e.g. Ti or Zr and in addition the oxides of the Group VIII metals, e.g. Fe, or Co or Ni, or mixtures of these metals or any two of them, such Group VIII metals each being in the range of about 0.1% to about 25%, preferably about 0.1% to about 5%, of the weight calculated as metal plus substrate. The atomic ratio of the Group VIII to Group VI metals is in the range of about 0.3 to 5 preferably 0.3 to 2.5 when the concentration of a phosphorous compound is also used, the ratios are as is described below. When employing molybdenum as the Group VI metal compound, we prefer to employ it in the form of the ammonium hepta molybdate.

The titanium oxide is used in a weight ratio of about 1% to about 40% or preferably, to about 25% expressed as titanium metal based on the weight of the alumina substrate on a volatile free basis. Preferably, for purposes of our present invention, less than about 25% of the titanium oxide are employed to obtain an active catalyst of suitable abrasion resistance and hardness.

As produced by our procedure, the catalyst of our invention has an abrasion index of less than about 10% and may be less than 2%, for example, 0.5% to about 1.5% and a hardness index about 2 to 10 by the procedure described below.

The process of our invention whereby the titanium is incorporated into the alumina hydrate, as titania hydrate, results in a substrate of superior abrasive resistance and hardness. Contrary to the teachings of the prior art referred to above, catalysts containing Group IV-B and Group VI metals particularly Mo and titanium produced by the procedures of our invention have the unexpected further advantage that, contrary to the teachings of the prior art, the alumina-titania substrate, formed of an intimate mixture of the alumina and titania oxides, will tolerate a much higher level of phosphate in the hydrodesulfurizing catalyst than is reported, as above, to be permissible in titanium bearing hydrodesulfurizing catalysts. On the contrary, as we have discovered, when the titanium is incorporated into the alumina according to our invention, the incorporation of phosphorous improves the hydrodesulfurization activity of the catalyst, as well as resulting in a catalyst of superior structural integrity.

We have, therefore, discovered that it is possible to employ an alumina-titania containing substrate, and obtain the benefits of the highly desirable phosphomolybdenum solutions, and obtain the benefits of stabilizing properties of the phosphate ion in the molybdenum solutions as has been reported in the prior art, if, as we have discovered, the alumina-titania substrate is formed as described herein. We are thereby able to use a solution containing both Mo and Co or Mo and Ni or Mo and Ni and Co to incorporate them into the alumina-titania substrate in one step rather than relying on using separate solutions of Mo salts and the cobalt or nickel salts in a multiple step impregnation.

We propose to employ the phosphate ion to stabilize solutions containing molybdenum and nickel or cobalt or nickel and cobalt. We claim no invention in the preparation of such stable solutions through the medium of the phosphate ion. Our invention insofar as it relates to such solutions is in the use of an alumina-titania substrate of our invention, when employing the phosphate stabilized molybdenum solution. We have found that such substrates are able to tolerate the levels of phosphorous in the substrate, which necessarily results when using the stable molybdenum solutions of the prior art, to incorporate sufficient molybdenum and nickel or molybdenum and cobalt or molybdenum and nickel and cobalt in the substrate of our invention to give a desirable level of activity in hydrodesulfurizing reactions.

The phosphate solutions may be added in the desired concentrations to the substrate either before forming the pellet or after shaping of the pellet containing the titania and alumina formed as described in the above U.S. Pat. No. 4,018,714 or the parent applications and also described herein.

Such procedures will employ our discovery that by using a substrate, as described herein, we can produce a desirably active hydrodesulfurizing catalyst when a phosphate stabilized molybdenum containing solution is employed.

Our presently preferred embodiment of our invention is to employ the procedures described herein to form the substrate and preferably by extruding an intimate mixture of alumina hydrate and titania hydrate into a pellet, adding the separately formed titania hydrate to the alumina hydrate with sufficient water to aid in forming the pellet, preferably pseudoboehmite, with sufficient water to aid in forming the pellet.

For the purpose of this invention, we prefer to form the appropriate mixture of alumina hydrate and titania hydrate with or without the presence of molybdenum, nickel, cobalt, or phosphorous compounds and form the same by extrusion into pellets. The pellet may then be dried and calcined. If the pellet does not contain the above hydrodesulfurizing catalytic metal atoms, they may be added to the calcined pellet by impregnating the pellet with the suitable phosphomolybdate solution preferably also containing a nickel or cobalt salt or a mixture of both in the appropriate ratios.

The addition of molybdenum salts and cobalt or nickel may be in concentrations as set forth in the said patent or the parent applications. While we may employ the stepwise impregnation of molybdenum followed by nickel or cobalt as set forth in the said parent patent or parent applications, our preferred embodiment, however, is to employ a phosphorous stabilized solution containing all of the metal compounds to be impregnated and to impregnate the substrate in one step. This not only simplifies the procedure but also is much more economical.

However, in the absence of the phosphorous in the solution containing the molybdenum and also the nickel or cobalt, a sufficient concentration of the metal compounds to supply the concentration of these metal compounds in the alumina-titania pellet is not practically attained.

It is, thus, a preferred embodiment of our invention to form solutions of the required concentration of molybdenum and nickel or cobalt or molybdenum and both nickel and cobalt and to apply the metals in the form of the salts simultaneously into the alumina-titania substrate of our invention. This may be accomplished by employing the solution of molybdenum salt and a cobalt salt or molybdenum salt and nickel salt, stabilized by phosphoric acid.

The solutions may be treated with hydrogen peroxide to convert the molybdenum salt into peroxymolybdate salts. (See Adams and Bulletin Dcb-16, supra.)

The phosphate ion is postulated to form a complex with molybdenum and cobalt or nickel.

The formulation of the phosphorous stabilized molybdenum and the cobalt-molybdenum solution and also the nickel-molybdenum solutions are now well known to those skilled in the art as described above. (See the above prior art)

We desire to employ the required volume of a solution which contains the compounds of the elements Mo, Co, or Ni and P in concentrations by weight in the following ranges of ratios and to introduce the quantities of the metal as stated below:

1 atomic weight of Ni or Co to about 0.3 to 2.5 atomic weights of Mo, preferably a ratio of about 1.5 to about 2.0 and to employ in such solutions phosphorous as phosphoric acid and at a pH of less than about 4, in which stabilized solutions the atomic ratio of Mo to P is less than about 4 and preferably less than about 2, for example, more than 0.01, at a pH of about 3.5 or less.

The above solutions are employed in substrates of titania and alumina composition containing a ratio of titania to alumina of from about 1% to about 25% of the alumina, the titania being expressed as metal Ti. Such substrates are combined with the above molybdenum complex to incorporate sufficient molybdenum Ni, Co, or mixtures of nickel and cobalt compound each equivalent to about 0.1% to about 25% of the metal Ni or Co, or mixture of Ni and Co, and from about 1% to about 25% by weight expressed as Mo, all based on the alumina and the said metals.

In such mixtures where the pellet is calcined either before or after the incorporation of the Mo and Ni or Co or Ni and Co, the Ti is present as anatase and the other metals as oxides and where phosphoric acid is used to form of the complex with molybdenum as above, the phosphoric acid is evaluated as $P_2O_5$.

Such solutions are stable for practical periods of time so that they may be made ahead of time and used as needed.

The substrate when employing the procedure whereby the molybdenum and the nickel or cobalt are added separately or as phosphated combination of Mo and Co or Ni, may be formulated by any of the procedures described in the parent patent application. For the purposes of our invention, we prefer to form the substrate by employing the titanium as the titania hydrate by mixing a separately formed titania hydrate with alumina hydrate.

The alumina pellet is formed from an intimate mixture of a hydrated alumina preferably a pseudoboehmite or boehmite. (See U.S. Pat. No. 4,018,714, describing such a pseudoboehmite.) In our presently preferred embodiment, it is then calcined.

The phosphated Mo, Co or Ni solution may be mixed with the alumina-titania mixture prior to forming into a pellet or after the pellet is dried and calcined as described in the above parent patent and patent applications. In our presently preferred embodiment, it is used to impregnate the calcined pellet as described herein.

Since as we have discovered that an intimate mixture of alumina and titania acting as a substrate will tolerate a substantial concentration of phosphate in a hydrodesulfurization catalyst formulated with an oxide of a Group VIII and Group VI metals, we may use, particularly where the Group VI compound is added separately from the Group VIII compound, the acids or salts of the phosphated anions of the Group VI metals in place of the phosphated molybdate solutions described above.

Such Group VI anions are the water soluble phosphomolybdic acid $20(MoO_3).P_2O_5.51H_2O$ or phosphotungstic acid $24(WO_3).2H_3PO_4.48H_2O$ or their ammonium salts. The atomic ratios of the above complex is 10 Mo to 1 P and 12 W to 1 P. The concentrations of the resultant products is as stated above.

These may be used either as an additive to the mixture of alumina hydrate and titania hydrate or zirconia hydrate or to the calcined pellet containing the intimate mixture of the above.

The following examples illustrate our invention in forming the substrate and also in employing the substrate to form hydrodesulfurizing catalysts.

EXAMPLE 1

15,000 grams of the pseudoboehmite (2,220 grams volatile free weight) were intimately mixed with 540 grams of titanium hydrate pulp, (45% $TiO_2$). The mixture was dried to an extrusion consistency (about 60% moisture), extruded through a die and dried at 210° F. for 16 hours and calcined at 1000° F. for 3 hours. The pellets were subjected to abrasion according to the above procedure.

X-ray examination shows that at least part of the titanium is in the form of anatase.

Pellets produced by the procedure according to Example 1 have abrasion indices ranging from about 0.1 to about 5.

EXAMPLE 2

Pseudoboehmite slurry was mixed with titania hydrate, dried and extruded into pellets as described above in Example 1. The extruded pellets were dried at 300° F. and calcined at 1350° F. for two (2) hours. The calcined pellets were placed in a container having a concave surface with its vertical axis mounted at an acute angle on a vertical rotating shaft. The pellets are tumbled and have their surfaces exposed to the solutions which are sprayed on the pellets as they are tumbled in an amount to be substantially entirely absorbed into the pellets.

2,530 grams of the pellets were impregnated by the procedure described above with 1,900 ml of ammonium molybdate solution obtained by dissolving 361 grams of $MoO_3$ in an ammonia solution containing 328 ml of 28% $NH_4OH$. The pellets were dried and impregnated by the procedure described above with 1630 ml of a nickel nitrate solution of concentration expressed as NiO of 114.5 grams NiO. The pellets were dried overnight and calcined at 1000° F. for 3 hours.

The pellets analyzed, expressed as metal 7.76% Mo, 2.84% Ni, and 5.21% Ti. The Abrasion Index of the pellets was 5.0%.

Instead of adding the titania hydrate to the alumina, we may generate the hydrate in situ by neutralizing a mixture of a salt of titanium, for example, titanium tetrachloride in a mixture with pseudoboehmite pulp, as described in the parent application.

EXAMPLE 3

A water slurry of 10,000 grams of pseudoboehmite (14.8% $Al_2O_3$) i.e., 1,480 grams of $Al_2O_3$ were placed in an agitated vessel. 1,080 ml of titanium chloride solution containing 162 grams $TiO_2$ and a 14% $Nh_4OH$ solution were added simultaneously to the alumina slurry, the quantity of $NH_4OH$ being adjusted to maintain the system alkaline. The pH was held from about 9.0 to 9.5 by adding a total of 1600 ml of 1:1 ammonium and water. The ratio of the weight of $TiO_2$ to the weight of $TiO_2$ plus the weight of $Al_2O_3$ was 0.1. The intimate mixture was then dried for the extrusion into pellets. The extrudates were dried at 250° F. for 16 hours. The pellets were calcined at 1000° F. for 2 hours.

EXAMPLE 4

Another portion of the dried extrudate pellets of Example 3 was calcined at 1350° F. for 2 hours.

EXAMPLE 5

An 867 gm portion of the pellets of Example 3 were impregnated with 380 ml ammonium molybdate solution of concentration expressed as $MoO_3$ of 104 grams $MoO_3$ and 94 ml 28% $NH_4OH$, dried at 250° F. for 16 hours and calcined at 600° F. for 2 hours.

327 ml nickel nitrate solution of concentration expressed as NiO of 32.9 grams NiO was then impregnated on the calcined pellets of Example 6, dried overnight at 250° F. and calcined at 1000° F. for 2 hours.

EXAMPLE 6

A portion of the pellets of Example 4 were impregnated with molybdenum and nickel by the same procedure as in Example 5.

The pellets were each analyzed for the content of the metallic compound in the pellets expressed as the metal; the porosity, surface area, and hardness (crush index) were determined and are stated in Table 1, infra.

EXAMPLE 7

15,000 grams of water containing pseudoboehmite filter cake produced by filtration of pseudoboehmite was slurried with 970 ml of tetraisopropyl titanate Ti-$(OC_3H_7)_4$ (spg. 0.955) containing an amount equivalent to 28% by weight of $TiO_2$ and the slurry agitated. The slurry was dried sufficiently to permit its extrusion into cylindrical pellets. The pellets were dried and calcined in the other at 1350° F. for 2 hours.

The composition and properties of the pellets were as follows:

| | |
|---|---|
| Crush Index | 4 |
| Density lb/ft$^3$ | 29 |
| Diameters inch | 0.032 |
| $TiO_2$ wt. % | 8.83 |
| Surface area $M^2/g$ (S.A.) | 192 |
| Pore Volume (PV) ml/g | 0.74 |

EXAMPLE 8

The pellets formed as in Example 7 were used as substrate and impregnated with Ni and Mo according to the procedure of Example 2. The catalyst contained titanium, nickel and molybdenum compounds in the form of their oxide in amounts expressed as metal 7.9% by weight of Mo, 2.8% by weight of Ni and 4.7% by weight of Ti. One portion of the catalyst was subjected to a hydrodesulfurizing process under the conditions stated in Example 9. The sulfur content of the treated distillate was 0.27%.

EXAMPLE 9

A portion of the catalyst of Example 8 was subjected to a standard test for hydrodesulfurization of a reduced petroleum crude oil of the type known as "resid" containing 3.67% sulfur.

The catalyst of Example 8 was "sulfided" by passing a vaporized petroleum distillate containing sulfur compounds at a temperature of 714° F. together with hydrogen at a pressure of 400 psig and at the rate of 1500 standard cubic feet per bbl of the oil and at 1 LHSV for 12 hours.

At the end of the sulfiding operation, the resid was introduced together with $H_2$ at 714° F. and the pressure was increased to 1000 psig and the hydrogen rate was increased to 5000 SCF/BBL at 1 LHSV for 40 hours. The resid sulfur was reduced to 1.36% sulfur.

TABLE 1

| Example | Crush Index | SA* | PV* | % Mo | % Ti | % Ni |
|---------|-------------|-----|-----|------|------|------|
| 3 | 8 | 224 | .55 | — | 5.03 | — |
| 4 | 8 | 203 | .45 | 8.42 | 4.38 | 2.78 |
| 5 | 8 | 192 | .55 | — | 5.03 | — |
| 6 | 8 | 159 | .35 | 7.78 | 4.26 | 2.75 |
| 7 | 4 | 192 | .74 | — | — | — |
| 8 | — | — | — | 7.9 | 4.7 | 2.8 |

SA*—Surface area, square meters per grams
PV*—Pore volume, ml per gram

The hardness values "Crush Index" are determined by conventional procedures such as are described in U.S. Pat. No. 3,598,759 and in "Mechanical Testing of Extruded, Tableted, and Ring-Formed Catalysts" by Earl R. Weaver, A.I.Ch.E. Symposium Series, No. 143, Vol. 70, pp. 6–8. In the procedure employed to obtain the hardness values reported in Table 1, the pellets were centered on an anvil support of 13 ml diameter. A pneumatically activated piston of 0.39" diameter is positioned above and centrally of the anvil. The pellet on its side was positioned on the anvil centered under the pellet. The piston was advanced until it just contacted the top side of the pellet and increased pressure was applied until the pellet crumbled. The force in pounds applied, measured by the pressure in the cylinder, is recorded as the hardness (here referred to as the Crush Index), as measured on a pressure gauge. The Hardness Index is determined as the average of 30–40 pellet determinations and the spread of the values is from about 1 to about 5% of the average.

Surface area was determined by the method described in the article by P. H. Emmett in "Advances in Catalysis", Vol. 1, 1948, pp. 64–89, Academic Press, N.Y. Pore volume and pore volume distribution were obtained from the desorption branch of the nitrogen absorption isotherm following the method described by E. P. Barrett, et al., J.A.C.S., Vol. 73, p. 373, et seq., (1951). All surface area data is stated herein as square meters per gram of sample ($M^2$/gm); all pore volumes stated herein are in cubic centimeters per gram (cc/gm) of sample.

The results described above show that the catalyst produced by employing the process of our invention produced a pellet of exceptional abrasion resistance and hardness. The hardness value of the substrate of our invention is of an order to produce a practical catalyst of superior hardness which will have improved performance in catalyst process, such as desulfurization of distillates and residual oils. The catalyst because of its resistance to abrasion, maintains its volume, thus permitting the maintenance of the LHSV. Since the reduction of S decreases with increasing LHSV, the reduction in volume of the catalyst in the reactor by loss of fines due to attrition, at a constant feed rate and temperature, reduced the effectiveness of the catalyst.

Thus, not only is the catalyst improved in that loss of fines of the catalyst is minimized and an economic gain is obtained and ecological hazards mitigated but also the catalyst of improved hardness results in an improvement in the catalytic process in which it may be used.

The introduction into the alumina-titania substrate formed according to our invention, employing the phosphomolybdate complexes containing Ni or Co, has in addition, the unexpected improvement in the hydrodesulfurizing activity of the catalyst as compared to the separate addition of a solution of compounds with Mo, followed by solutions of compounds of Ni or Co.

EXAMPLE 10

A pellet formed according to Example 1 employing titania-hydrate in amount sufficient to give the content of titanium expressed as $TiO_2$ as stated below, was dried and calcined as in Example 2.

The calcined pellet was impregnated according to the one-step variation of the procedure of Example 2 with a solution of ammonium phosphomolybdate formed as described above, mixed with a nickel nitrate solution containing equivalents of 400 grams $MoO_3$ per liter formed by reacting a water dispersion of molybdic oxide with ammonium hydroxide (25% $NH_3$) to form the ammonium molybdate and then adding phosphoric acid to form the ammonium phosphomolybdate containing $Ni(NO_3)_2$ equivalent to 0.239 gms of NiO per liter. The calcined pellet containing the phosphomolybdate-nickel complex was dried and calcined and analyzed as follows, on a volatile free basis:

| | | |
|---|---|---|
| Ti as $TiO_2$ | = 8.4% | by weight |
| Mo (as metal) | = 8% | by weight |
| Ni (as metal) | = 3% | by weight |
| P as $P_2O_5$ | = 3.2% | by weight |
| Crush Index | = 6.8 | |

EXAMPLE 11

Example 10 was repeated except that ammonium molybdate was used instead of ammonium-phosphomolybdate, and the impregnation was by the two step procedure of Example 2. The calcined alumina-titania pellets were first impregnated with an ammonium molybdate solution dried and then impregnated with nickel nitrate solution. These ingredients were used in phosphorous to give the pellet composition as follows. The calcined pellet analyzed on a volatile free basis:

| | | |
|---|---|---|
| Ti as $TiO_2$ | = 8.4% | by weight |
| Ni (as metal) | = 3% | by weight |
| Mo (as metal) | = 8% | by weight |
| Crush Index | = 5.5 | |

EXAMPLE 12

Hydrated titania containing about 33% of $TiO_2$ on a volatile free basis, i.e. 67% water, was mixed with hydrated alumina (pseudoboehmite) and water. The $TiO_2$ volatile free was 10% by weight of the mixture of $TiO_2$ and $Al_2O_3$ both calculated on a volatile free basis. The moisture content of the mixture was about 65%.

Prior to mixing with the titania, the alumina hydrate was mixed with water and peptized (see Lim, et al U.S. Pat. No. 4,086,187, column 7, and Secor, et al U.S. Pat. No. 4,010,116, column 7) and mulled in a muller for about 15 minutes. The mulled alumina hydrate is then mixed with the titania hydrate and again mulled for about 15 minutes.

The resultant mix is a substantially uniform dispersion of the titania hydrate containing the water required for extrusion into a moist pellet having sufficient consistency to permit handling. The pellet is dried and calcined as in Example 1, and is impregnated with ammonium phosphomolybdate formed as in Example 10 and mixed with a cobalt nitrate solution instead of nickel nitrate according to the procedure of Example 10. The ammonium phosphomolybdate, cobalt nitrate solution had a composition and was used in amounts as indicated by the following analysis of the calcined pellet on a volatile free basis:

| | | |
|---|---|---|
| Ti as $TiO_2$ | = 8.4% | by weight |
| Mo (as metal) | = 10% | by weight |
| Co (as metal) | = 3.1% | by weight |
| P as $P_2O_5$ | = 4.0% | by weight |
| Crush Index | = 7.9 | |

EXAMPLE 13

The process of Example 11 was followed employing the ammonium molybdate solution without the addition of the phosphoric acid, except cobalt nitrate instead of nickel nitrate as in Example 11. The reagents were used in amounts to give the pellet the following composition.

The calcined pellet had the following composition on a volatile free basis:

| | | |
|---|---|---|
| Ti as $TiO_2$ | = 8.4% | by weight |
| Mo (as metal) | = 10% | by weight |
| Co (as metal) | = 3.1% | by weight |
| Crush Index | = 7.7 | |

The calcined and impregnated pellets of Examples 10–13 were each subjected to the following hydrodesulfurizing test.

A weighed sample of the catalyst was sulfided by passing vaporized West Texas Vacuum Gas Oil containing sulfur compounds equivalent to 2.12% by weight as elemental sulfur -S- together with hydrogen at 400 p.s.i.g. The liquid hourly space velocity was 1 and the temperature was 714° F. and the hydrogen gas rate was 1500 standard cubic feet per barrel of gas oil. The sulfiding was continued for 5 hours.

To test the desulfurizing activity of the catalyst for gas oil desulfurization, the above operation was continued and the product sampled after 10 hours following the sulfiding step and the sulfur content determined.

The following results were observed for the above examples. The activity rating is the terminal sulfur content resulting when using the one step phosphorous complex as compared to and the step where addition of Mo and then Ni or Mo and then Co. The ecological advantage of a reduction in the terminal sulfur content is emphasized by the very large utilization of sulfur containing oils in power house operations and as a source of gasoline where part of the sulfur ends up in the gasoline.

| | | |
|---|---|---|
| Ex. 10 | $Al_2O_3/TiO_2/Mo/Ni/P$ | 0.18% |
| Ex. 11 | $Al_2O_3/TiO_2/Mo/Ni$ | 0.22% |
| Ex. 12 | $Al_2O_3/TiO_2/Mo/Co/P$ | 0.12% |
| Ex. 13 | $Al_2O_3/TiO_2/Mo/Co$ | 0.20% |

Comparing Example 10 with Example 11, the resultant desulfurized oil of Example 10 contained 82% of the sulfur of the product of Example 11 and in the case of Example 12, 60% of the sulfur of Example 13. It will be seen that in the case of the Ni-Mo phosphorous complex, the one step impregnation, there yields only 85.7% of the final sulfur product; in the case of the two step addition required when the phosphorous complex is not used.

A similar improvement in sulfur reduction was observed in the hydrodesulfurization of atmospheric resids containing sulfur compounds equivalent to 4% expressed as elemental sulfur. Following the above sulfiding of the catalysts of Examples 10, 11, 12, and 13, the operation for 10 hours as described above, the feed was switched to the above atmospheric resid. The temperature was again 714° F. and the hydrogen gas at a pressure of 1000 p.s.i.g. was at rate in standard cubic feet per barrel of 5000. The oil rate was in liquid hourly space velocity (LHSV) of 1. The product was sampled after 12 and 24 hours and tested for sulfur.

| | | 12 hours | 24 hours |
|---|---|---|---|
| Example 10 | $Al_2O_3/TiO_2/Mo/Ni/P$ | 0.93 | 1.03 |
| Example 11 | $Al_2O_3/TiO_2/Mo/Ni$ | 1.36 | 1.35 |
| Example 12 | $Al_2O_3/TiO_2/Mo/Co/P$ | 0.92 | 1.2 |
| Example 13 | $Al_2O_3/TiO_2/Mo/Co$ | 1.3 | 1.4 |

In the case of the residual oils, the improvement in the residual sulfur resulting in using the one step process of Example 10 and 12 as compared with the two step process of Example 11 and 12 is as follows:

| | 12 hours | 24 hours |
|---|---|---|
| Improvement in Example 10 compared with Example 11 | 68% | 78% |
| Example 12 compared with Example 13 | 70% | 86% |

The reduction in the sulfur produced by the single step impregnation using the phophomolybdate complex with the Ni or Co is highly significant due to the large usage of sulfur containing oil and the large amount of oxides of sulfur that are vented to the atmosphere.

Instead of impregnating the calcined pellets as in the examples, the molybdate and the Ni or Co or mixed Ni and Co salts may be added in amounts equivalent to those as used in the Examples during the mixing of the substrate as in Example 1. Thus the solution of the phosphomolybdate nickel complex or the equivalent cobalt complex is added after the titania hydrate is added to the alumina hydrate. The water content of the molybdate complex forming part of the extrusion mix.

Alternatively, the phosphomolybdate nickel or cobalt complex may be added in the slurry mixture of the alumina and titania as in Example 2. The intimate mixture of alumina hydrate, titania hydrate and the phosphomolybdate complex is then dried to form an extrusion mix, dried and calcined as in Example 2.

Our discovery that when the titanium is substantially uniformly distributed as oxide throughout the alumina substrate it permits of the incorporation of substantial amounts of phosphorous, has enabled us to form stable solutions containing both molybdenum and nickel or molybdenum and cobalt. The phosphorous complexes permits forming solutions containing sufficiently high concentrations of both Mo and Ni or Co so that a one step impregnation of the alumina titania substrate becomes practical.

The resultant pellets are abrasion resistant and have superior hardness. The discovery is entirely unexpected that in such cases a very substantial reduction in the resultant sulfur content of the treated oil both for distillate treatment and for residual oil where the alumina-titania-molybdenum-nickel or cobalt one step product is used can only be said to be an entirely unexpected advantage which could not have been predicted.

Our invention, in its preferred form, is thus of two separate characters.

One is the discovery that the alumina-titania pellets comprising an intimate mixture of alumina and hydrated oxide of a Group IV-B metal formed by intimately mixing the hydrates produces on calcination, a suitable base for a catalyst. The hydrated oxide of the Group IV-B metal may formed separately, and intimately mixed with the alumina hydrate or may be formed in situ in the alumina hydrate slurry by a hydrolytic reaction. In both cases, the water content being suitable, the mixture may then be shaped into a pellet which when calcined at a sufficiently high temperature and for a sufficient time, gives an abrasion resistant hard pellet useful as substrate for various catalyst uses. Our preferred embodiment of the Group IV-B metal oxide is anatase produced by calcining the uniform and intimate mixture of the titania hydrate and alumina hydrate. A particular useful form of catalyst is the hydrodesulfurizing catalysts formed by incorporating the oxides of Group VIII and Group VI metals, stable at the calcination conditions with the pellet the oxides of molybdenum and an oxide of nickel or cobalt produced by heat treatment of their salts as our presently preferred oxides.

The other surprising discovery is that the teachings of the prior art, that it is not practical to incorporate phosphorous compounds into an alumina pellet carrying a titanium compound and Group VIII and Group VI metal compounds is not applicable if the titanium is distributed throughout the body of the alumina substrate in the form of titanium oxide. This discovery permitted the application of the molybdenum and the cobalt or nickel as a complex with phosphorous. Not only was this an improvement due the economy of the permissible one step application but it permitted the production of a pellet of superior abrasion resistance and hardness in the form of the alumina-titania pellets of our invention to improve the technology and economy of the process.

The entirely unexpected discovery that in addition to the above advantages, a substantial improvement in the terminal sulfur content of the treated oil as has been shown above, may be obtained, it is submitted, makes this invention a worthy contribution to the energy situation because of the substantial improvement in the process for removing sulfur from sulfur containing oil.

In preparing the hydrodesulfurizing catalyst, the ammonium molybdate may be introduced into the substrate as an ammonium polymolybdate, for example, ammonium dimolybdate or ammonium hepta molybdate but preferably as the hepta molybdate. Hydrogen peroxide may be added to such a solution of ammonium heptamolybdate. The nickel or cobalt may be used as a salt for example as nitrates.

The process of introduction of the Mo, Ni, or Co may be, step wise that is, sequentially applied to the calcined $Al_2O_3$-$TiO_2$ substrate, by impregnation as described above with intermediate drying between salt introduction.

The ammonium molybdenum solution may be stabilized if desired by employing phosphoric acid as described above.

We prefer to use solutions for incorporation by employing complexes of the molybdates with phosphate ion as described above in conjunction with either nickel salt or cobalt salt or mixtures thereof and to employ the mixture to incorporate the Mo and Ni or Mo and Co or the Mo, Co and Ni in one step. This may be done as described above by addition either to the alumina hydrate-titania hydrate prior to pellet formation, or after calcination of the pellet. In such case the phosphomolybdate solution containing the Ni and/or Co may be added to the slurry of hydrated alumina and titania hydrate formed either by admixture or in situ hydrolysis as described above. The phosphomolybdate-nickel or cobalt complex may be added to the pellet after it has been formed and dried and calcined as described above.

For this purpose we prefer to employ the phosphate complex of the above metals as described above.

The catalyst of our invention is particularly useful in hydrodesulfurizing distillates and residual petroleum fractions, but also useful to treat coal derived liquid fractions containing sulfur compounds.

The operating conditions employed in the process of our invention employing the catalysts of our invention are at a temperature in the range from about 500° F. to about 1000° F., preferably in the range from about 600° to about 800° F.; space velocity from about 0.1 to about 10.0 volumes of liquid charge stock per volume of catalyst per hour. A preferred range is from about 0.5 to about 5.0. The hydrogen feed rate ranges from about 500 to about 10,000 standard cubic feet per barrel of feed stock, preferably in the range from about 1,000 to about 8,000 SCF/bbl. The pressure employed ranges from about 500 to about 5,000 p.s.i.g. When the feed stock is a distillate, we prefer to employ a pressure of about 250 to 2,500 p.s.i.g. For residual-containing stock, such as, for example, a reduced crude (atmospheric tower bottoms), the preferred pressures are in the range from about 500 to about 3,000 p.s.i.g.

The catalyst of our invention is a pellet of composition as described above which has been heat treated at temperature and for a time to generate the oxides of the Group VIII, Group VI and Group IV-B metallic elements and to dehydrate the pellet. The pellet is anhydrous and is an active hydrodesulfurizing catalyst of excellent crush resistance, for example, a crush index of about 4 or more. The catalyst particularly those into which phosphorous is incorporated have exceptional hardness and crush index above 5 and are highly active hydrodesulfurizing catalysts useful both for desulfurizing of petroleum distillates or residual fractions, and coal derived liquid fractions containing sulfur compounds.

It is to be understood that in starting the composition of the pellet in the form of percentages, the values refer to average values of the pellets obtained from an analysis of a sample of the catalyst composed of several pellets although individual pellets may vary from the average value.

Our presently preferred embodiment of a catalyst for hydrodesulfurizing of distillate is illustrated by Example 10 and for treatment of resids, Example 12.

We claim:

1. In the process of hydrodesulfurizing petroleum fractions, such as petroleum distillate or petroleum resid at elevated temperatures and superatmospheric pressure by passing hydrogen and the petroleum fraction over a hydrodesulfurizing catalyst consisting of an alumina support promoted with metals of Group IV-B, Group VI-B and Group VIII, the improvement which comprises conducting the hydrodesulfurization over a high strength, abrasion-resistant catalyst having an "Abrasion Index" of less than about 10% and a "Crush Index" of less than about 10; the catalyst being in the form of an anhydrous pellet consisting of a substrate and catalytic promoters, the substrate being essentially an intimate mixture of dehydrated alumina and a Group IV-B metal oxide selected from anatase and zirconia; the catalytic promoters containing at least one Group VIII metal oxide selected from the oxides of Fe, Ni or Co; and a Group VI-B metal compound selected from the metals of Mo and W, which metal compound is present in the form of a metal phosphate.

2. The process of claim 1, wherein the Group VI-B metal promoter is an Mo-P compound, and wherein the atomic ratio of Mo to P is less than 4, and more than 0.01 and the Mo is present in the catalyst in an amount equivalent to 1–25% by weight.

3. The process of claim 1, wherein the Group VI-B metal promoter is a W-P compound and wherein the atomic ratio of W to P is 12 to 1.

* * * * *

UNITED STATES PATENT AND TRADEMARK OFFICE
CERTIFICATE OF CORRECTION

PATENT NO. : 4,382,854
DATED : May 10, 1983
INVENTOR(S) : Geoffrey Wilson et al

It is certified that error appears in the above-identified patent and that said Letters Patent are hereby corrected as shown below:

Front Page, "Assignee: Filtral Corporation" should be --Assignee: Filtrol Corporation--

Column 2, Line 60, "3,287,280" should be --3,237,280--

Column 6, Line 62, "tungsten" should be --tungstate--

Column 7, Line 8, "tungsten" should be --tungstate--

Column 7, Line 43, "33-7/8" should be --33-1/3--

Column 13, Line 25, "pellet" should be --piston--

Column 18, Line 54, "starting" should be --stating--

Signed and Sealed this

Thirtieth Day of July 1985

[SEAL]

Attest:

DONALD J. QUIGG

Attesting Officer    Acting Commissioner of Patents and Trademarks